United States Patent [19]

Dudley

[11] 3,794,758

[45] Feb. 26, 1974

[54] SELECTABLE DISPLAY SYSTEM

[75] Inventor: Don J. Dudley, Brightwaters, N.Y.

[73] Assignee: Data-Plex Systems, Inc., Greenwich, Conn.

[22] Filed: July 25, 1972

[21] Appl. No.: 275,081

[52] U.S. Cl........ 178/6.8, 178/DIG. 6, 178/DIG. 35

[51] Int. Cl. ........................................... H04n 7/18

[58] Field of Search...............178/DIG. 6, DIG. 23, DIG. 35, 178/5.6, 6.8; 35/9 B, 9 R

[56] References Cited

UNITED STATES PATENTS

| | | | |
|---|---|---|---|
| 3,566,482 | 3/1971 | Morchand | 178/5.6 |
| 3,624,289 | 11/1971 | Dudley | 178/DIG. 23 |
| 3,532,806 | 10/1970 | Wicklund | 178/7.1 |

*Primary Examiner*—Robert L. Griffin

*Assistant Examiner*—Joseph A. Orsino, Jr.

*Attorney, Agent, or Firm*—Hane, Baxley & Spiecens

[57] ABSTRACT

There is disclosed a selectable display system wherein fields and/or frames of television signals are dividable into quadrants and stored in a video tape recorder. As the recorder transmits the signals to a television display device, video signals in particular lines of the fields assist in the selection by a viewer through the agency of selector switches which quadrant is to be displayed.

10 Claims, 3 Drawing Figures

SELECTABLE DISPLAY SYSTEM EDS

SELECTABLE DISPLAY SYSTEM

THE INVENTION

This invention pertains to video display systems and more particularly to television systems wherein a user can select portions of fields of video signals for display.

In the field of self-teaching educational television it is known to generate programs wherein fields of video signals are divided into quadrants. While each quadrant is a self-contained scene, the quadrants of a field are generally related. For example, a user or student may be posed a multiple choice question with four possible answers. Thereafter the fields transmitted will be divided into four quadrants with each quadrant being related to one of the four possible choices. The viewer then via the agency of selector switches in a control box selects an answer by operating one of four switches which causes a related quadrant to be displayed.

Generally, to control the timing of the display, control signals are transmitted with the video signals. Heretofore, these control signals were audio tones included in the audio band of a television channel. Such a technique is taught in U.S. Pat. No. 3,256,386. While this technique has proven to be successful it is relatively expensive and complicated.

Recently there have been proposals to provide inexpensive training devices and games utilizing a video tape reproducer which transmits programs recorded on a magnetic tape cartridge to a simple television display device. In order to cut down the cost of such systems each component must be made as cheaply as possible. Therefore, the selector portion of the system must be made as cheap and reliable as possible and still maintain sufficient versatility for use in a teaching system.

It is accordingly a general object of the invention to solve this problem.

Briefly, the invention contemplates apparatus for selecting portions of a field of video signals for display by a television receiver wherein the video signals are transmitted by a television transmitter which in addition to transmitting the video signals also transmits horizontal and vertical synchronizing signals for creating a conventional television line raster in the receiver. The apparatus includes raster line selecting means responsive to the synchronizing signals for selecting at least one particular line of the television line raster, detector means for detecting a particular video signal in the selected line, and generator means operative if the particular video signal is detected for generating video blanking control signals which are in synchronism with the synchronizing signals and related to particular portions of the field. The apparatus further includes subject (viewer) operable switch means for selecting which of the video blanking control signals is transmitted to the video circuits of the television receiver. Other objects, the features and advantages of the invention will be apparent from the following detailed description, when read with the accompanying drawings which show the presently preferred embodiments of the invention. In the Drawings:

Figure 1:
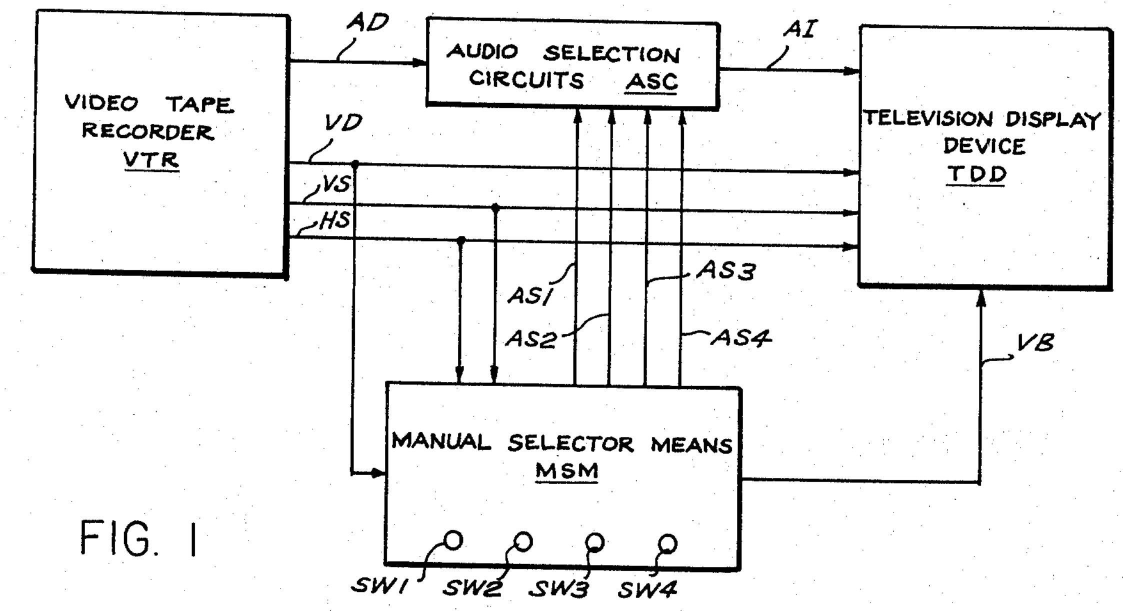
FIG. 1 is a block diagram of a selectable display system utilizing, by way of example, a video tape recorder and a television display device under control of a manual selector means.

In FIG. 1 there is shown a selectable display system EDS suitable for educational purposes comprising a video tape recorder VTR, audio selector circuits ASC, television display device TDD and manual selector means MSM.

Figure 2:
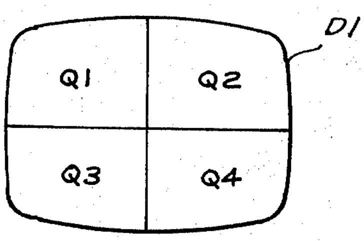
FIG. 2 shows the screen of a television display divided into four quadrants.

Video tape recorder VTR can be a conventional video tape recorder using magnetic tape cartridges which transmits audio signals onto a line AD, conventional, vertical and horizontal synchronizer signals onto lines VS and HS, respectively, and video signals onto line VD. The signals are so related that when received by a television display device fields are created as in a conventional television line raster scan. In addition, the video signals are so arranged as in the usual case that, for example, the first twenty lines of the raster are constant "black", i.e., do not carry any video information. However, each of lines seventeen and eighteen can selectively include a single pulse. These single pulses will be used as control signals to establish vertical and horizontal "splits" which will be combined as hereinafter becomes apparent to aid in the selection of quadrants of fields for display. The remaining lines of the raster, i.e., those other than the first 20 will carry video information for displaying fields. These video fields can be of two types. One wherein the field contains a single unitary scene. In such case, the control signals will not be present on lines seventeen and eighteen. The other wherein the field contains four scenes wherein each scene occupies a single quadrant. See quadrants Q1, Q2, Q3, and Q4 of the screen D1 of a television display device as shown in FIG. 2. Note the audio signals on line AD can be multiplexed so that a different sound sequence is associated with each quadrant.

Television display device TDD can be the television receiver which is compatible with the video tape recorder VTR and has a display screen such as the screen D1 of FIG. 2, and includes horizontal and vertical drive circuits which receive the horizontal and vertical synchronizing signals on lines VS and HS for generating the television line raster, and also includes video circuits which receive the video signals on line VD for intensity modulating the beam of the cathode-ray tube of the display. In addition, the television display device receives video blanking signals from line VB. These signals can be coupled into the video circuits or even onto the grid of the cathode-ray tube in such a manner that when the blanking signal is present the electron beam is cut off. For the sake of completeness the television display device can include audio circuits for receiving audio signals from line AI.

The manual selector means MSM, hereinafter more fully described, includes selector switches, SW1, SW2, SW3, and SW4 and circuits operating with signals received from lines VD, VS and HS for manually selecting quadrants Q1, Q2, Q3 and Q4 by means of signals on line VB and sound sequences associated therewith by means of signals on lines AS1, AS2, AS3 and AS4 fed to audio selection circuits ASC.

Audio selection circuits ASC which do not form part of the present invention and will hence not be described in detail receive multiplexed audio signals on line AD, select the desired sound sequence signals as indicated by signals on lines AS1 to AS4 and transfer the selected signals to line AI.

In operation, and by way of example, video tape recorder VTR starts transmitting a multiple choice training program. At first when a question is posed full screen fields are transmitted without the control signals. These fields are displayed by television display device TDD. Then quadranted fields with the control signals are transmitted. At that time nothing is displayed until a student depresses one of the switches SW1 to SW4 wherein each switch is keyed to one of the possible multiple choice answers. The depression of the selected switch results in the generation of a signal on line VB causing the display of the associated quadrant and also results in the generation of a signal on one of the lines AS1 to AS4 to select the appropriate sound sequence.

Now it should be noted that during operation the horizontal and vertical synchronizing pulses are continuously fed from tape recorder VTR via lines HS and VS, respectively, to television display device TDD so that television line rasters are continuously generated. Similarly, the video signals are transmitted on line VD. Therefore, which video signals are displayed is determined by the state of line VB which carries a video blanking control signal. When the signal is present or "high" the video signals are displayed. When the signal is absent or "low" the video signals are not displayed.

Figure 3:
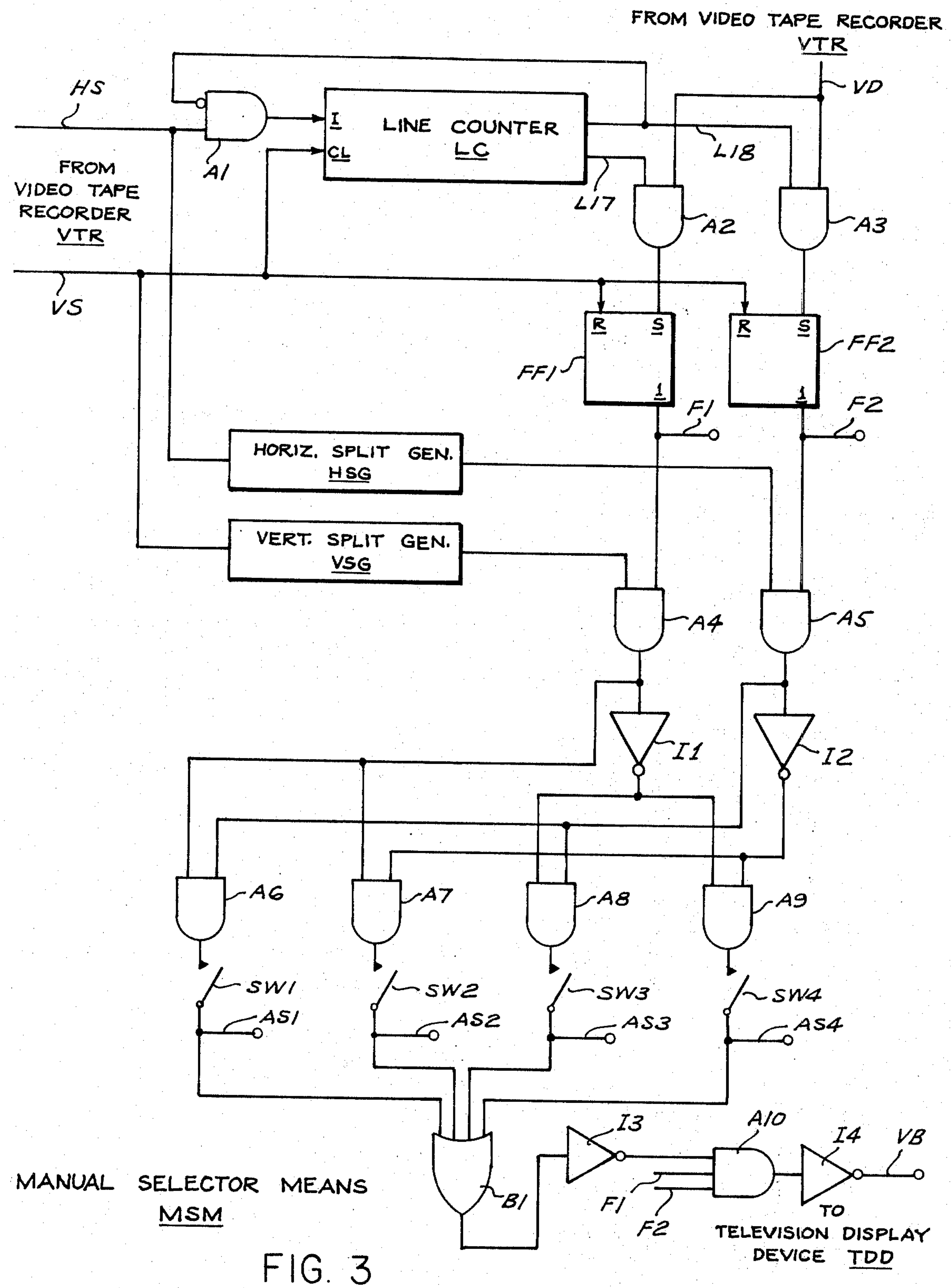
FIG. 3 is a logic diagram of the manual selector means of FIG. 1.

The state of line VB is determined by manual selector means MSM which is shown in detail in FIG. 3. Manual selector means MSM includes a line selecting means centered around AND-circuit A1 and line counter LC, a detector means centered around AND-circuits A2 and A3 and set-reset flip-flops FF1 and FF2, generator means centered around horizontal split generator HSG, vertical split generator VSG, and two-input AND-circuits A4 to A9, and subject operable switch means centered around manually operable switches SW1 to SW4.

More specifically line counter LC can be a pulse counter which counts pulses received at its input I from the output of AND-circuit A1 and which transmits a pulse on line L17 when a count of seventeen in accumulated and transmits a pulse of line L18 when a count of eighteen is accumulated. Note that line L18 is connected to an inhibiting input of AND-circuit A1 whose other input is connected to line HS. In addition the clear input CL of counter LC is connected to line VS. Thus in operation a vertical sync pulse of line VS clears the counter LC at the start of each field. Then the counter starts counting horizontal sync pulses (one per raster line). Upon receipt of the seventeenth sync pulse (associated with raster line 17) line L17 goes high alerting AND-circuit A2 to sense for a video pulse on line VD connected to its other input. When the 18 sync pulse (associated with raster line 18) is received, line L18 goes high alerting AND-circuit A3 to sense for a video pulse on line VD connected to its other input. In addition since line L18 is also connected to the inhibiting input of AND-circuit A1, line counting ceases for the rest of the field and only recommences at the start of the next field after the vertical sync pulse on line VS clears counter LC.

Since the set inputs S of flip-flops FF1 and FF2 are connected to outputs of AND-circuits A2 and A3, respectively, and since the reset inputs R of both of these flip-flops are connected to line VS, then a video pulse in raster line 17 of any field will set flip-flop FF1 for the remainder of that field while a video pulse in raster line 18 of any field will set flip-flop FF2 for the remainder of that field. At the end of such fields the flip-flops will be reset.

Now the "1" output of flip-flop FF1 is connected to one input of AND-circuit A4 whose second input is connected to the output of vertical split generator VSG. Vertical split generator VSG can be a one shot multivibrator for generating one cycle of a 50 percent duty cycle square wave having a period equal to the time between adjacent vertical sync pulses which is triggered by pulses on line VS. Similarly, the "1" output of flip-flop FF2 is connected to one input of AND-circuit A5 whose other input is connected to the output of horizontal split generator HSG. Horizontal split generator HSG can be a one shot multivibrator for generating one cycle of a 50 percent duty cycle square wave having a period equal to the time between adjacent horizontal sync pulses which is triggered by pulses on line HS.

The output of AND-circuit A4 is connected to one input of each of the AND-circuits A6 and A7, and via inverter I1 to one input of each of the AND-circuits A8 and A9. The output of AND-circuit A5 is connected to one input of each of the AND-circuits A6 and A8 and via inverter I2 to one input of each of the AND-circuits A7 and A9.

It should be noted that the interconnections are such that provided flip-flops FF1 and FF2 are set, the output of AND-circuit A6 is high during quadrant Q1 (see FIG. 2), the output of AND-circuit A7 is high during quadrant Q2, the output of AND-circuit A8 is high during quadrant Q3, and the output of AND-circuit A9 is high during quadrant Q4.

The outputs of AND-circuits A6, A7, A8, and A9 are connected via switches SW1, SW2, SW3 and SW4, respectively, to inputs of OR-circuit B1 and also to lines AS1, AS2, AS3, and AS4, respectively. Thus, in effect, the depression of one of the switches SW1 to SW4 will transmit a high level associated with a particular quadrant to OR-circuit B1 and onto one of the lines AS1 to AS4 for selecting the sound sequence associated with the particular quadrant.

The output of OR-circuit B1 is connected via inverter I3 to one input of three-input AND-circuit A10 whose other two inputs are connected via lines F1 and F2, respectively, to the "1" outputs of flip-flops FF1 and FF2, respectively. The output of AND-circuit A10 is connected via inverter I4 to line VB.

Now it should be recalled that when line VB is low, blanking occurs in television display device TDD. Therefore, assuming that lines F1 and F2 are high it should be apparent, due to the inverters I3 and I4, that when switch SW1 is closed only quadrant Q1 will be displayed, when switch SW2 is closed only quadrant Q2 will be displayed, etc. The function of lines F1 and F2 is to insure that full fields are displayed, regardless of the action of switches SW1 to SW4, when neither of the flip-flops FF1 and FF2 is set. Since these flip-flops can only be set when pulses are in reaster lines 17 and 18, it should be apparent that the absence of such pulses occurs only at those times when the program calls for full field displays.

There has thus been shown improved apparatus for selecting particular quadrants from multiquadrant fields of video signals. While a specific embodiment of the invention has been shown and described in detail many variations are possible for implementing the invention as defined in the appended claims. For example, while the system has been described with respect to television fields, it is contemplated for use with frames formed from interlaced fields. In addition, while positive AND/OR logic was used to implement the control functions other logic such as negative logic, NAND/NOR logic or the like can be used. Also it should be noted that inverters were used merely to simplify and clarify the logical operations, whereas in practice the inverters and other logic elements ordinarily would be combined to minimize the circuitry.

It should be noted that, although it has been shown how, by means of pulses on two lines to divide the field into four scenes one could divide the field into two fields. For example, a pulse of line 17 would generate V-splits and a pulse on line 18 would generate H-splits

What is claimed is:

1. Apparatus for combination with a television transmitter which transmits at least video signals and horizontal and vertical synchronizing signals to a television viewer having circuits which generate a line (or) raster in response to received horizontal and vertical synchronizing signals and video circuits which display visual information in response to received video signals, to select portions of at least a field of video signals for display comprising line selecting means responsive to (the) at least the horizontal synchronizing signals of the television transmitter for selecting at least one particular line of the line raster of a field, detector means cooperating with said line selecting means for detecting a particular video signal in said particular line, generator means operative if said particular video signal is detected in said particular line for generating video blanking control signals synchronized to at least one of the synchronizing signals, each of said generated video blanking control signals being related to a particular portion of the field, and subject operable switch means for selecting which of said generated video blanking control signals is transmitted to the video circuits of the television receiver.

2. The apparatus of claim 1 wherein said line selecting means comprises means for counting the number of horizontal synchronizing signals occurring after a vertical synchronizing signal and generating a first line selecting signal when a first particular count is reached.

3. The apparatus of claim 2 wherein said detector means includes means for indicating the coincidence of said first line selecting signal and said particular video signal.

4. The apparatus of claim 1 wherein said generator means comprises a triggered square wave generator for generating at least one cycle of a square wave signal when triggered by a particular one of the synchronizing signals, the period of said square wave signal being related to the frequency of said particular one of the synchronizing signals.

5. The apparatus of claim 4 wherein said line selecting means comprises means for counting the number of horizontal synchronizing signals occurring after a vertical synchronizing signal and generating a first line selecting signal when a first particular count is reached.

6. The apparatus of claim 5 wherein said detector means includes means for indicating the coincidence of said first line selecting signal and said particular video signal.

7. The apparatus of claim 2 wherein said line selecting means further comprises means for generating a second line selecting signal when a second particular count is reached.

8. The apparatus of claim 7 wherein said detector means comprises first coincidence means for indicating the coincidence of said first line selecting signal and a particular video signal occurring in the line associated with said first line selecting signal, and second coincidence means for indicating the coincidence of said second line selecting signal and a particular video signal occurring in the line associated with said second line selecting signal.

9. The apparatus of claim 8 wherein said generator means comprises a first triggered square wave generator for generating one cycle of a first square wave signal and the inverse thereof when triggered by a horizontal synchronizing signal the period of said first square wave signal being related to the frequency of said horizontal synchronizing signal, and a second triggered square wave generator for generating one cycle of a second square wave signal and the inverse thereof when tirggered by a vertical synchronizing signal, the period of said second square wave signal being related to the frequency of said vertical synchronizing signal, said first triggered square wave generator being operative only when said first coincidence means gives an indicator and said second triggered square wave generator being operative only when said second coincidence means gives an indicator.

10. The apparatus of claim 9 wherein said generator means further comprises a first AND-logic means for transmitting a signal during the simultaneous occurrence of a first level of said first square wave signal and a first level of said second square wave signal, a second AND-logic means for transmitting a signal during the simultaneous occurrence of a second level of said first square wave signal and the first level of said second square wave signal, a third AND-logic means for transmitting a signal during the simultaneous occurrence of the first logic level of said first square wave signal and a second logic level of said second square wave signal, and fourth AND-logic means for transmitting a signal during the simultaneous occurrence of the second levels of each of said first and second square waves signals.

* * * * *